(12) United States Patent
Ushiyama et al.

(10) Patent No.: US 9,205,689 B2
(45) Date of Patent: Dec. 8, 2015

(54) IMAGE PRINTING APPARATUS, IMAGE PRINTING METHOD, AND IMAGE PROCESSING APPARATUS

(71) Applicant: CANON KABUSHIKI KAISHA, Tokyo (JP)

(72) Inventors: Takayuki Ushiyama, Kawasaki (JP); Yoshitomo Marumoto, Kawasaki (JP); Hitoshi Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/699,978

(22) Filed: Apr. 29, 2015

(65) Prior Publication Data

US 2015/0314621 A1    Nov. 5, 2015

(30) Foreign Application Priority Data

May 1, 2014   (JP) .................. 2014-094814

(51) Int. Cl.
*B41J 2/205*    (2006.01)
*B41J 29/38*    (2006.01)

(52) U.S. Cl.
CPC ....................... *B41J 29/38* (2013.01)

(58) Field of Classification Search
CPC ........ B41J 2/2135; B41J 11/42; B41J 22/425; B41J 2/36; B41J 2/5056; B41J 2/04593; B41J 2/2121; B41J 3/60; B41J 29/393; B41J 2/145; B41J 2/2054; G06F 3/1219
USPC ............ 347/9–11, 14–16, 19, 43, 57; 358/1.2
See application file for complete search history.

(56) References Cited

U.S. PATENT DOCUMENTS

| 7,506,949 | B2 * | 3/2009 | Shimoji | 347/15 |
| 8,472,079 | B2 * | 6/2013 | Miyake et al. | 358/2.1 |
| 2005/0219294 | A1 | 10/2005 | Nakazawa | |

* cited by examiner

*Primary Examiner* — Hai C Pham
(74) *Attorney, Agent, or Firm* — Canon U.S.A., Inc. IP Division

(57) ABSTRACT

The present disclosure is directed to an image printing apparatus, image printing method, and image processing apparatus. The image printing apparatus and image printing method print images by controlling the connectivity of dots by using mask patterns having different numbers of print permitting pixels in accordance with the attributes of the images.

12 Claims, 20 Drawing Sheets

FIG. 1A
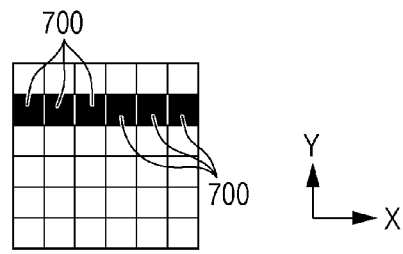
FIG. 1B1  FIG. 1B2  FIG. 1B3  FIG. 1B4
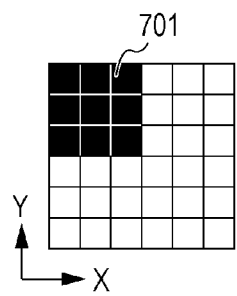 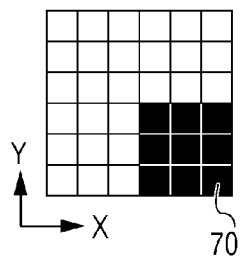 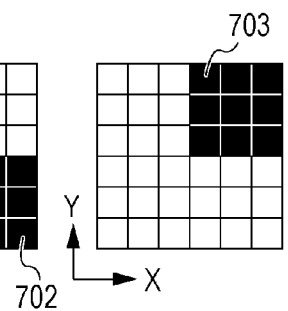 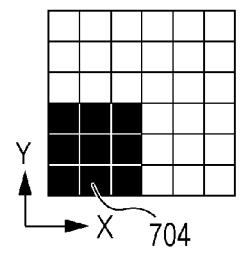
FIG. 1C
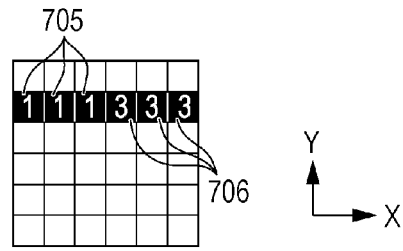
FIG. 1D
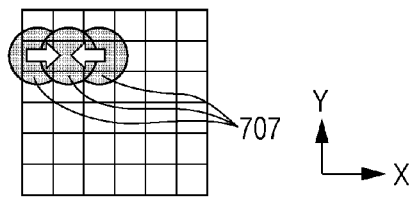
FIG. 1E
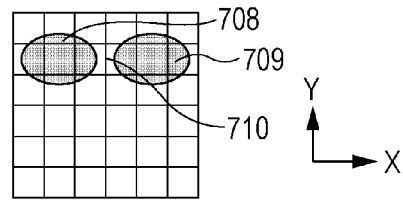

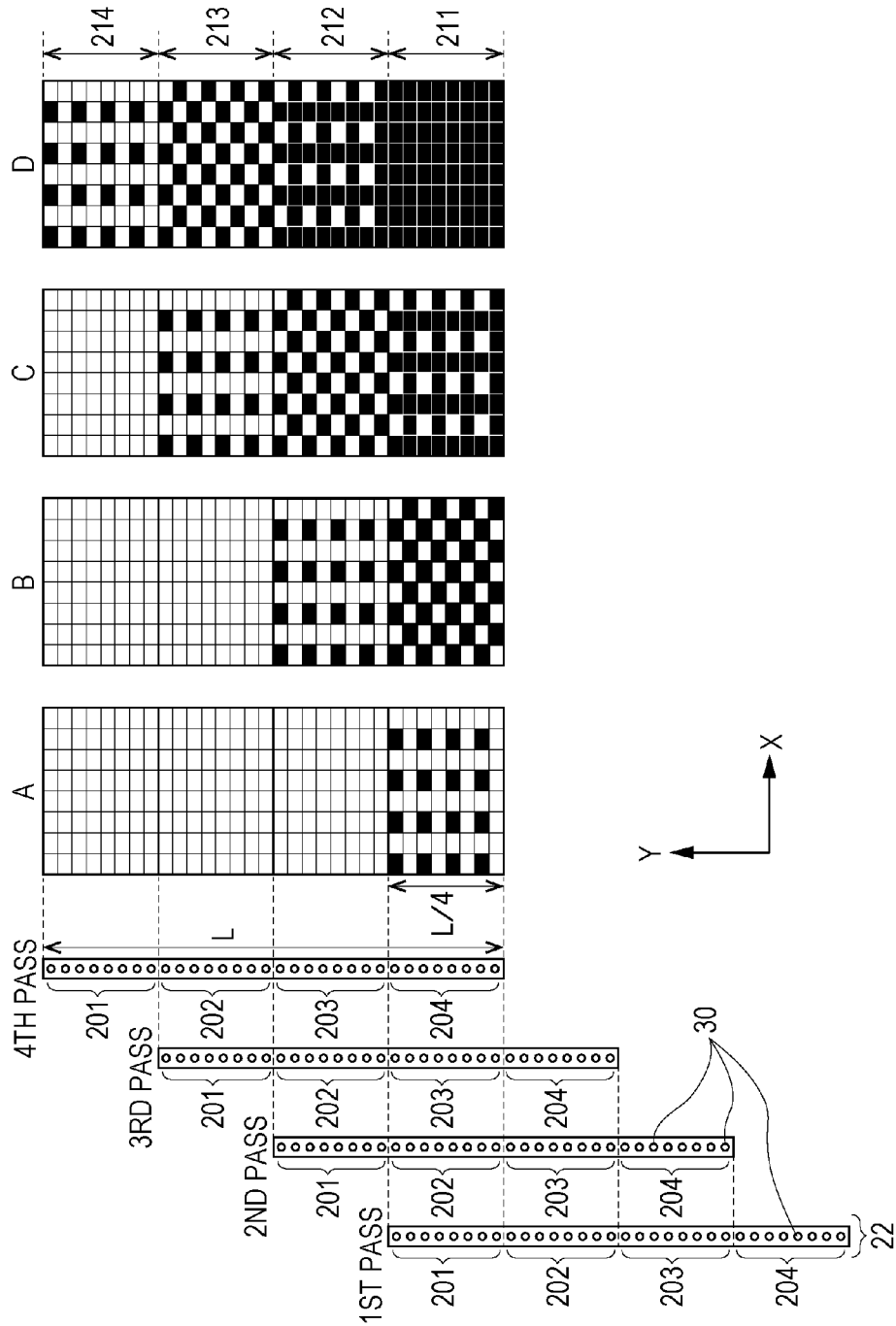

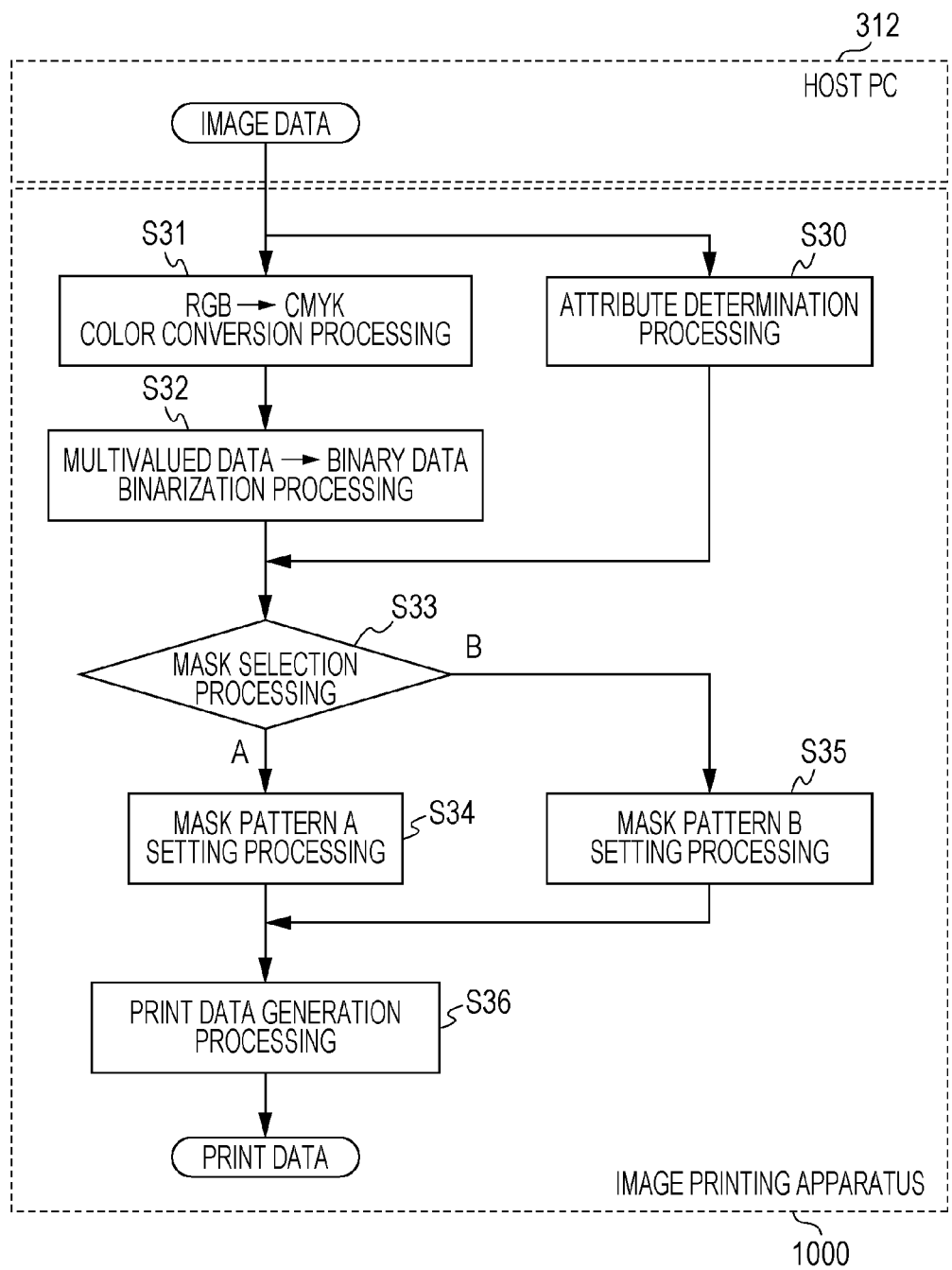

FIG. 11A 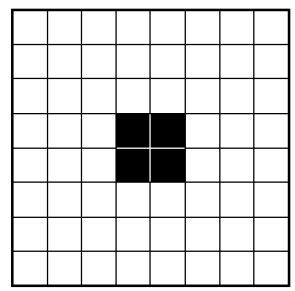 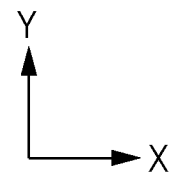
FIG. 11B 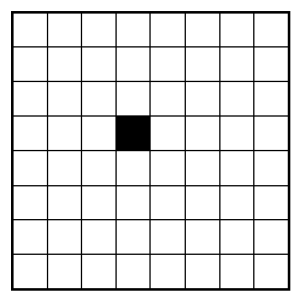 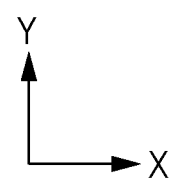
FIG. 11C 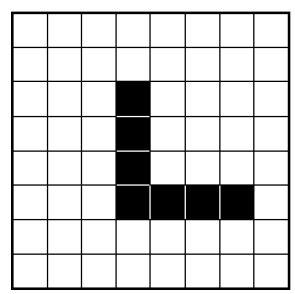 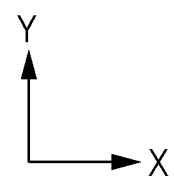
FIG. 11D 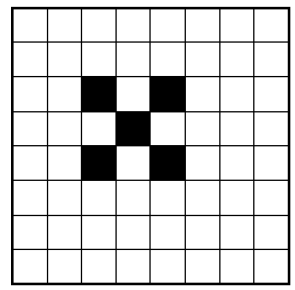 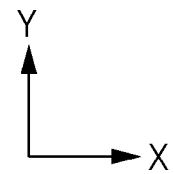

FIG. 12A
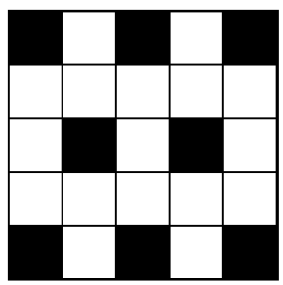
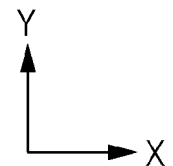
FIG. 12B
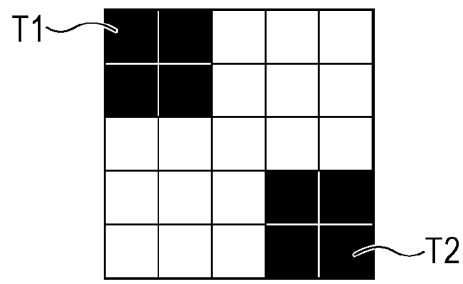
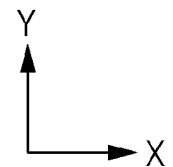

FIG. 13A
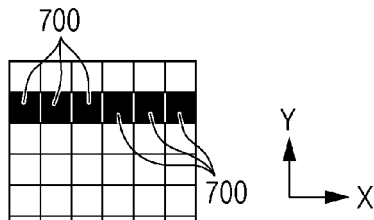
FIG. 13B1  FIG. 13B2  FIG. 13B3  FIG. 13B4
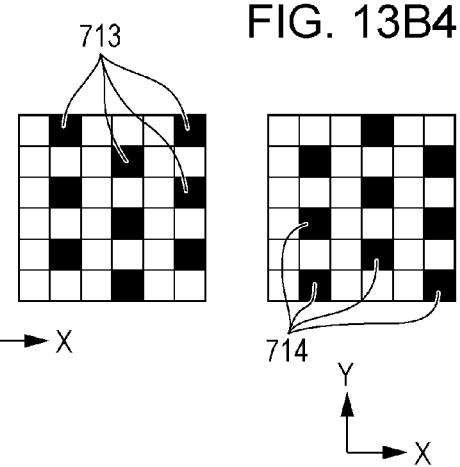
FIG. 13C
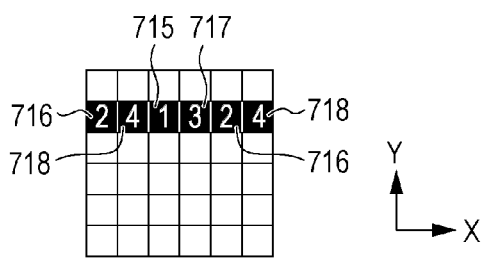
FIG. 13D
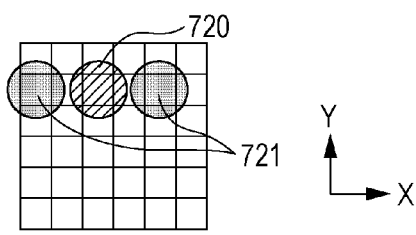
FIG. 13E
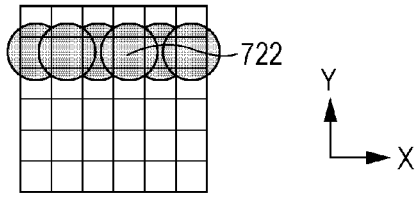

IMAGE PRINTING APPARATUS, IMAGE PRINTING METHOD, AND IMAGE PROCESSING APPARATUS

BACKGROUND OF THE INVENTION

1. Field of the Invention

The present invention relates to an image printing apparatus, image printing method, and image processing apparatus.

2. Description of the Related Art

There is a known image printing apparatus that prints images by repeating print scans in which ink is discharged to a unit area of a printing medium while moving a print head including an array of a plurality of print discharge openings through which ink is discharged relatively in a scan direction and sub-scans in which the printing medium is conveyed in a conveyance direction substantially perpendicular to the scan direction. Such an image printing apparatus can use a so-called multipass printing method, which is a known method for forming an image by dividing data of the image to be formed using mask patterns in which print permitting pixels where printing is permitted in each scan and performing a plurality of print scans on a unit area.

It is known that the image printing apparatus using such a multipass printing method can use different mask patterns in accordance with various conditions. US Patent Publication NO. 2005/0219294 discloses setting the number of adjacent pixels in which printing is permitted in a mask pattern (hereinafter also referred to as print permitting pixels) used in printing an image on a glossy printing medium at a value larger than the number of adjacent print permitting pixels in a mask pattern used in printing an image on plain paper. According to this patent literature, the use of the above-described mask patterns can reduce the roughness of printed images and thus can print the images with suppressed decrease in glossiness.

However, when the above-described mask pattern with many locations of adjacent print permitting pixels is used, a desired image quality may not be obtained, depending on the attribute of the image.

This issue is described below in detail.

FIGS. 1A to 1E are illustrations for describing a process in printing a fine-line image as one example using mask patterns with many adjacent print permitting pixels.

FIG. 1A schematically illustrates binary data corresponding to a fine-line image. In FIG. 1A, the pixels indicated as the filled squares denote the pixels to which ink is to be discharged, and the pixels indicated as the open squares denote the pixels to which ink is not to be discharged. For character images and the like, the number of pixels to which ink is to be discharged arranged in the X direction or Y direction is smaller than that for graphical images such as pictures. Here, an example case is discussed. In this case, as one example of binary data corresponding to a fine-line image, binary data in which six pixels 700 are aligned in the X direction is processed. The pixels 700 are the ones to which ink is to be discharged. The X and Y directions are common to FIGS. 1A to 1E.

That binary data is allocated to a plurality of scans by mask patterns. Here, a case where printing is performed on a unit area by four scans is described as one example. FIGS. 1B1 to 1B4 illustrate mask patterns corresponding to first to fourth scans, respectively, on the unit area. In FIGS. 1B1 to 1B4, the pixels indicated as the filled squares denote print permitting pixels, and the pixels indicated as the open squares denote pixels where printing is not permitted (hereinafter referred to as non-print permitting pixels). In the mask patterns illustrated in FIGS. 1B1 to 1B4, the print permitting pixels are arranged such that the number of adjacent print permitting pixels is large. Specifically, each of sets 701 to 704 of print permitting pixels consists of nine print permitting pixels adjacent in the X and Y directions, and the nine print permitting pixels are arranged in a three-by-three matrix.

FIG. 1C schematically illustrates print data generated based on the binary data illustrated in FIG. 1A and the mask patterns illustrated in FIGS. 1B1 to 1B4. The pixels indicated as the filled squares denote pixels to which ink is discharged, and the digit in each of these pixels indicates what number the scan in which the ink is discharged to that pixel is. Among the six pixels to which ink is to be discharged, three pixels 705 adjacent in the X direction and corresponding to the set 701 of print permitting pixels in the mask pattern illustrated in FIG. 1B1 are the pixels to which ink is to be discharged in the first scan. Three pixels 706 adjacent in the X direction and corresponding to the set 703 of print permitting pixels in the mask pattern illustrated in FIG. 1B3 are the pixels to which ink is to be discharged in the third scan.

FIG. 1D illustrates an image printed when the first scan is performed and ink is discharged in accordance with the print data schematically illustrated in FIG. 1C. In the first scan, three ink droplets 707 are discharged to the three pixels 705 adjacent in the X direction illustrated in FIG. 1C. These ink droplets 707 are provided to locations in contact with each other on the printing medium. Thus, the ink droplets 707 are drawn to each other in directions in which they gather indicated by the arrows in FIG. 1D.

FIG. 1E illustrates an image printed when the fourth scan is completed and ink is discharged in accordance with the print data schematically illustrated in FIG. 1C. Because the three ink droplets 707 illustrated in FIG. 1D are drawn to each other, as described above, they forms a dot 708 slightly shrinking in the X direction after fixation. Similarly, three ink droplets (not illustrated) discharged to the three pixels 706 adjacent in the X direction in the third scan illustrated in FIG. 1C gather, they form a dot 709 slightly shrinking in the X direction.

When the dots are formed as described above, as is obvious in FIG. 1E, a paper blank portion 710, which is not covered with the dots, is formed in the fine-line image. Such a paper blank portion formed in the fine-line image may degrade the image quality of the fine-line image.

As described above using one example, a mask pattern with a relatively increased number of adjacent print permitting pixels is useful in improving the glossiness, but the effects on the image quality may be an issue, depending on the attribute of an image to be printed.

SUMMARY OF THE INVENTION

An aspect of the present invention provides an image printing apparatus including a printing control unit, a determining unit, an acquiring unit, and a generating unit. The printing control unit is configured to print an image in a unit area on a printing medium by performing a plurality of scans relatively in a scan direction by a print head for discharging ink on the unit area in accordance with print data that specifies whether the ink is to be discharged or not to each of a plurality of pixel areas corresponding to a plurality of pixels in the unit area in each of the plurality of scans. The determining unit is configured to determine an attribute of the image to be printed in each of a plurality of determination areas obtained by division of the unit area. The acquiring unit is configured to acquire binary data that specifies whether the ink is to be discharged or not to each of the plurality of pixel areas in the plurality of determination areas. The generating unit is configured to generate the plurality of print data to be used in printing in the plurality of scans based on a plurality of first mask patterns and a plurality of second mask patterns in which print permitting pixels and non-print permitting pixels are arranged and the binary data acquired by the acquiring unit, the plurality of first mask patterns and the plurality of second mask patterns corresponding to the plurality of scans, the print permitting pixels permitting ink to be discharged, the non-print permitting pixels not permitting ink to be discharged. When each of a print permitting pixel group consisting of a plurality of adjacent print permitting pixels and a print permitting pixel that is not adjacent to the other print permitting pixels in each of the mask patterns is defined as a single unit, a mean of the numbers of the print permitting pixels in the units in one mask pattern of the plurality of second mask patterns is larger than a mean of the numbers of the print permitting pixels in the units in one mask pattern of the plurality of first mask patterns. The generating unit is configured to generate the plurality of print data based on the plurality of first mask patterns when the determining unit determines that the attribute of the image to be printed in the determination area is a first attribute and configured to generate the plurality of print data based on the plurality of second mask patterns when the determining unit determines that the attribute of the image to be printed in the determination area is a second attribute different from the first attribute.

Further features of the present invention will become apparent from the following description of exemplary embodiments with reference to the attached drawings.

BRIEF DESCRIPTION OF THE DRAWINGS

FIGS. 1A to 1E are illustrations for describing a process in printing a fine-line image.

FIG. 6 is an illustration for describing a typical multipass printing method.

FIG. 8 is a block diagram that illustrates a data processing process according to the embodiment.

FIGS. 11A to 11D are illustrations for describing units of print permitting pixels according to the embodiment.

FIGS. 12A and 12B are illustrations for describing assessment areas in mask patterns according to the embodiment.

FIGS. 13A to 13E are illustrations for describing a process in printing a fine-line image according to the embodiment.

DESCRIPTION OF THE EMBODIMENTS

A first embodiment of the present invention will be described below with reference to the drawings.

First Embodiment

Figure 2:
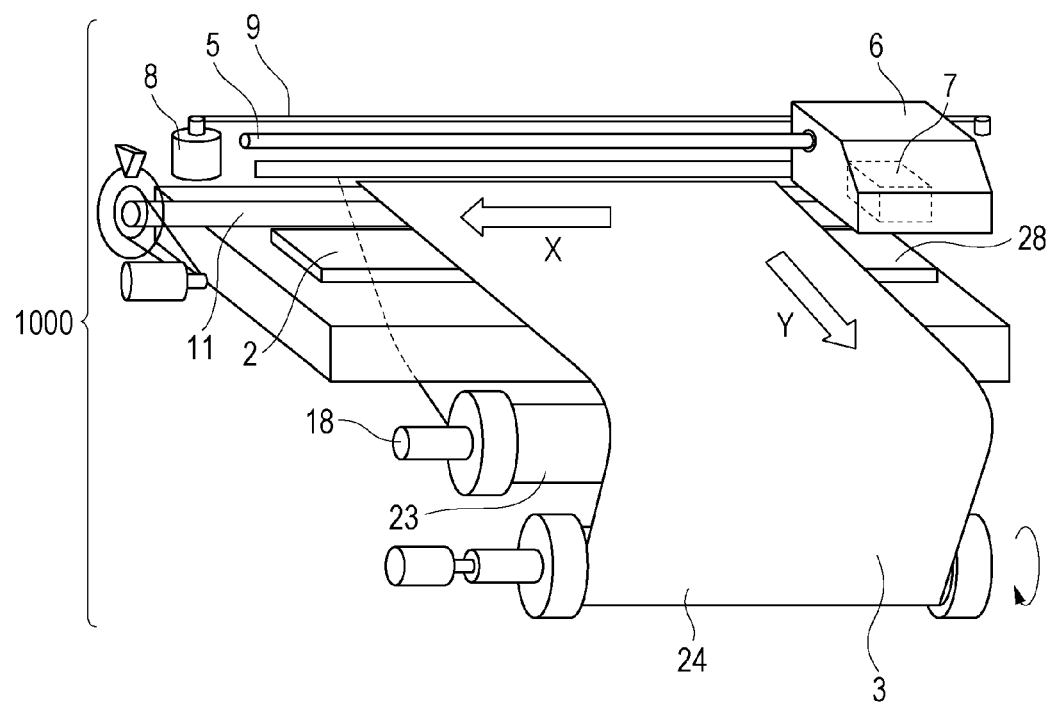
FIG. 2 is a perspective view of an image printing apparatus according to an embodiment.
Figure 3:
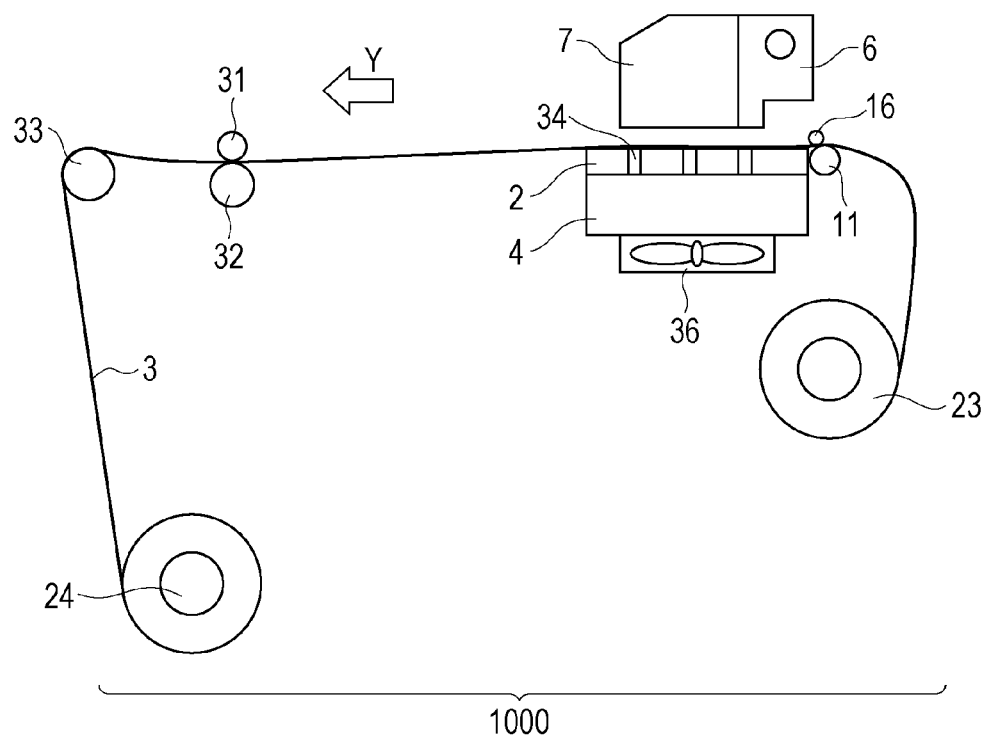
FIG. 3 is a side view of the image printing apparatus according to the embodiment.

FIG. 2 is a perspective view that partially illustrates an internal configuration of an image printing apparatus 1000 according to the first embodiment of the present invention. FIG. 3 is a side view that partially illustrates an internal configuration of the image printing apparatus 1000 according to the first embodiment of the present invention.

The image printing apparatus 1000 includes a platen 2. The platen 2 is arranged inside the image printing apparatus 1000 and has many suction holes 34 to cause a printing medium 3 to be attracted to the platen 2 under suction to prevent the printing medium 3 from floating. The suction holes 34 are connected to a duct 4. A suction fan 36 is arranged below the duct 4. The printing medium 3 is attracted to the platen 2 under suction by the operation of the suction fan 36.

A carriage 6 is supported on an extending main rail 5 and can move reciprocally in the X direction (scan direction). The carriage 6 carries a print head 7 having an ink jet system described below. The print head 7 can use various print systems, including a thermal jet system employing a heating element and a piezoelectric system employing piezoelectric transducers. A carriage motor 8 is a drive source for moving the carriage 6 in the X direction, and its rotational driving force is transmitted to the carriage 6 through a belt 9.

The printing medium 3 is fed by being unwound from a roll medium 23. The printing medium 3 is conveyed on the platen 2 in the Y direction (conveyance direction), which is substantially perpendicular to the X direction. The leading edge of the printing medium 3 is held between a pinch roller 16 and a conveyance roller 11. The printing medium 3 is conveyed by the driving of the conveyance roller 11. The printing medium 3 is held between a roller 31 and an ejection roller 32 downstream of the platen 2 in the Y direction. The printing medium 3 is wound around a wind-up roller 24 through a turn roller 33.

Figure 4:
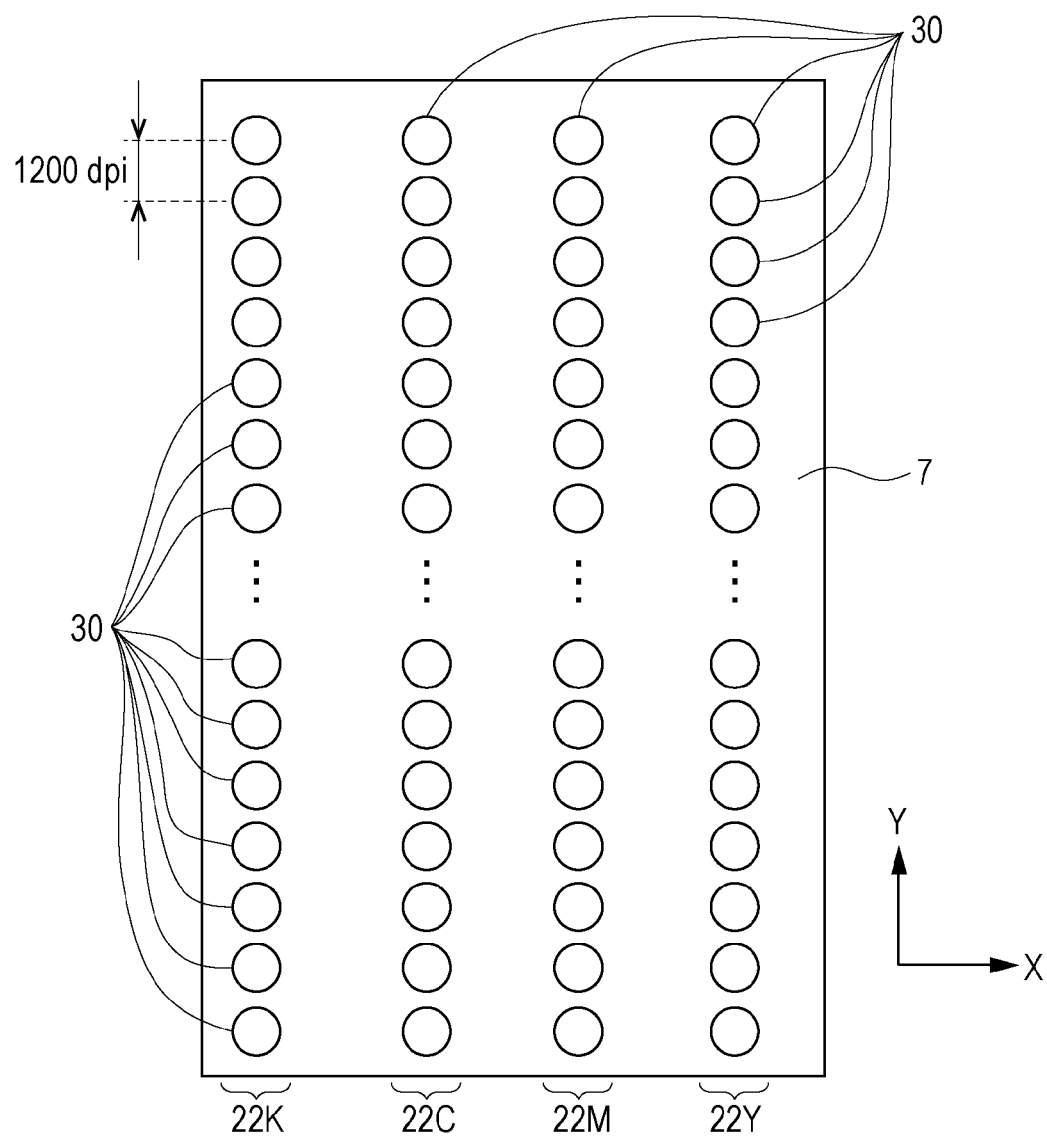
FIG. 4 is a schematic view of a print head according to the embodiment.

FIG. 4 illustrates the print head used in the present embodiment.

The print head 7 is configured so as to have four discharge opening arrays 22K, 22C, 22M, and 22Y allowing black (K) ink, cyan (C) ink, magenta (M) ink, and yellow (Y) ink to be discharged therethrough. The discharge opening arrays 22K, 22C, 22M, and 22Y are arranged in parallel in the X direction. Each of the discharge opening arrays 22K, 22C, 22M, and 22Y is configured such that 1,280 discharge openings 30 allowing ink to be discharged therethrough are arranged in the Y direction (arranging direction) at a density of 1,200 dpi. The amount of ink discharged through a single discharge opening 30 at a time in the present embodiment is approximately 4.5 ng.

The discharge opening arrays 22K, 22C, 22M, and 22Y are connected to their respective ink tanks (not illustrated) storing corresponding ink and are use in supplying ink therefrom.

The print head 7 and the ink tanks used in the present embodiment may be integral with each other or may be able to be separated from each other.

Figure 5:
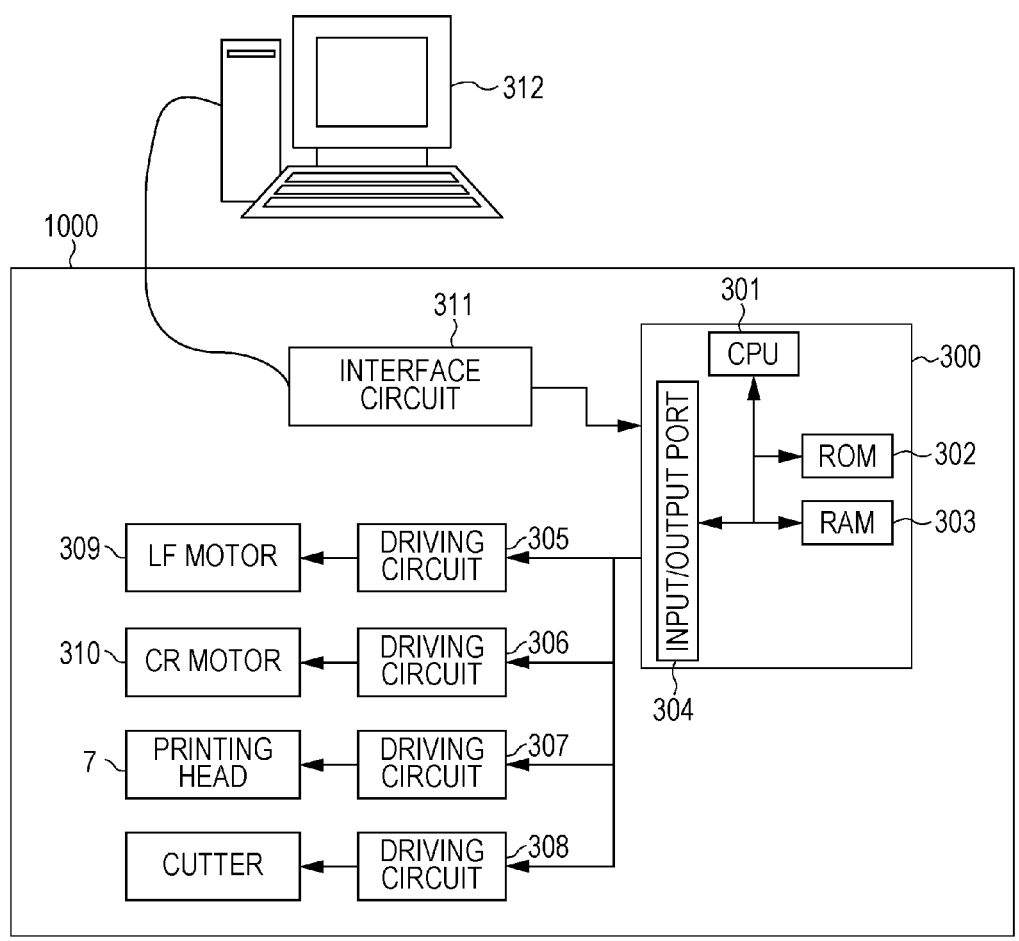
FIG. 5 is a block diagram that illustrates a configuration of a print control system according to the embodiment.
Figure 7A:
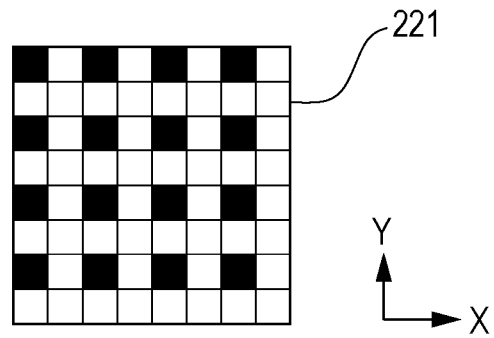
FIGS. 7A to 7D are schematic diagrams of mask patterns used in the typical multipass printing method.
Figure 7B:
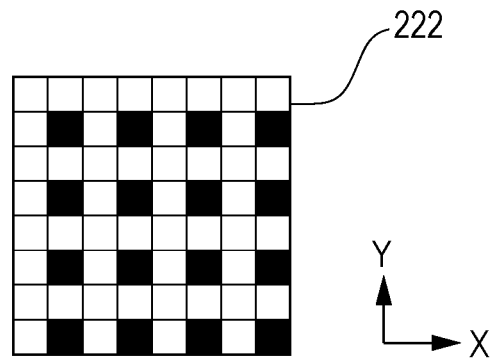
Figure 7C:
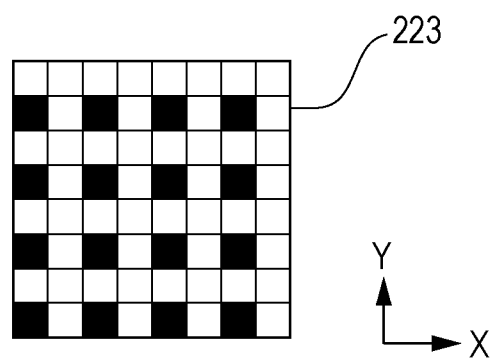
Figure 7D:
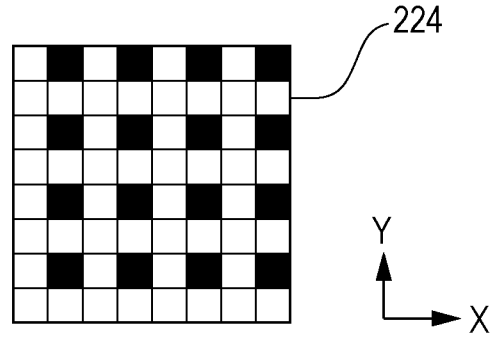

FIG. 5 is a block diagram that illustrates a schematic configuration of a control system in the present embodiment. A main controller 300 includes a central processing unit (CPU) 301 configured to execute processing operations, including calculation, selection, determination, and controlling, a read-only memory (ROM) 302 storing a control program to be executed by the CPU 301 and the like, a random-access memory (RAM) 303 used as a buffer for print data and the like, an input/output port 304, and the like. The ROM 303 also stores mask patterns described below. The input/output port 304 is connected to driving circuits, such as actuators, 305, 306, 307, and 308 for driving a conveyance motor (linefeed (LF) motor) 309, a carriage motor (carriage return (CR) motor) 310, the print head 7, and a cutter for cutting the printing medium. The main controller 300 is connected to a personal computer (PC) 312, which is a host computer, through an interface circuit 311.

In the present embodiment, an image is printed by a so-called multipass printing method that is a method for printing an image by performing four scans on a unit area in a printing medium by the print head.

FIG. 6 is an illustration for describing a typical multipass printing method used in printing an image in a unit area on a printing medium by four print scans.

FIGS. 7A to 7D are illustrations for describing mask patterns used in the print scans in the above-described multipass printing method.

The discharge openings 30 in the discharge opening arrays 22 allowing ink to be discharged therethrough are divided into four discharge opening groups 201, 202, 203, and 204 along the Y direction.

Each of mask patterns 221, 222, 223, and 224 is configured such that a plurality of print permitting pixels for specifying discharge of ink and a plurality of non-print permitting pixels for specifying non-discharge of ink are arranged. In FIGS. 7A to 7D, the pixels indicated as the filled squares denote the print permitting pixels, and the pixels indicated as the open squares denote the non-print permitting pixels. For the print permitting pixels, when image data indicating that ink is to be discharged is input, it is identified as print data in which ink is to be discharged. For the non-print permitting pixels, even when image data indicating that ink is to be discharged is input, it is identified as print data in which ink is not to be discharged.

The print permitting pixels in these mask patterns 221, 222, 223, and 224 lie in mutually different locations where the logical sum of them is all pixels.

An example case is described below. In this case, an image of a duty of 100% (hereinafter also referred to as solid image) is formed on a printing medium.

In the first print scan (first pass), ink is discharged to an area 211 on the printing medium 3 through a discharge opening group 201 in accordance with the mask pattern 221. Thus, the ink is discharged in locations indicated by the filled squares in A in FIG. 6 on the printing medium.

Next, the printing medium 3 is relatively conveyed by a distance of L/4 from the upstream side to the downstream side in the Y direction with respect to the print head 7.

After that, the second print scan (second pass) is performed. In the second print scan, ink is discharged to the area 211 on the printing medium through the discharge opening group 202 in accordance with the mask pattern 222, and ink is discharged to an area 212 through the discharge opening group 203 in accordance with the mask pattern 221. As a result of this second print scan, an image indicated by filled squares in B illustrated in FIG. 6 is formed on the printing medium 3.

Subsequently, a print scan by the print head 7 and relatively conveying the printing medium 3 are alternately repeated. Upon the completion of the fourth print scan (fourth pass), discharging the ink to the pixel area corresponding to all pixels in the area 211 in D on the printing medium 3 is completed, and the solid image is formed.

FIG. 8 is a flowchart for describing an image processing process according to the present embodiment.

RGB-format multi-valued data input from the host PC 312, which is a host computer, into the image printing apparatus proceeds to RGB color conversion processing step S31 and attribute determination processing step S30. In attribute determination processing step S30, the attribute is determined for each determination area in a unit area, as described below. Information on the attribute in each determination area obtained in step S30 is sent to mask selection processing step S33.

In color conversion processing step S31, the RGB-format multi-valued data obtained from the host PC 312 is converted to CMYK-format multi-valued data corresponding to ink colors to be used in printing.

Then, in binarization processing step S32, each of the CMYK-format multi-valued data obtained in color conversion processing step S31 is transformed into CMYK-format binary data. As the method used in the binarization, a density pattern method, dithering method, error diffusion method, or other method may be suitably used.

In mask selection processing step S33, which mask pattern A or B described below should be selected for each CMYK-format binary data for each determination area obtained in binarization processing step S32 in accordance with the attribute in that determination area obtained in attribute determination processing step S30. The binary data corresponding to the determination areas for which setting the mask patterns A is selected proceeds to mask pattern A setting processing step S34, and it is allocated to a plurality of scans by mask pattern processing described below. The binary data corresponding to the determination areas for which setting the mask patterns B is selected proceeds to mask pattern B setting processing step S35, and it is allocated to a plurality of scans by the mask pattern processing described below.

In print data generation processing step S36, the binary data allocated to the plurality of scans in each determination area in mask pattern A setting processing step S34 or mask pattern B setting processing step S35 are combined to generate print data corresponding to the unit area.

The image is printed by discharging of the ink from the print head 7 in each of the plurality of scans in accordance with the print data generated in the above manner.

The attribute determination processing in attribute determination processing step S30 in the present embodiment is described below.

In the present embodiment, the unit area is divided into a plurality of determination areas each having a size of an eight-by-eight matrix of pixels, spatial frequency analysis is conducted on from the RGB-format multi-valued data for each of the determination areas, and thus the attribute of the image is determined.

First, RGB-format multi-valued data for a single determination area is converted into CIE L*a*b* data using the following equations (1) to (5), and it is stored in the RAM 303.

$$R'=R/65535$$

$$G'=G/65535$$

$$B'=B/65535 \qquad \text{Equations (1)}$$

If R', G', B'≤0.04045, $$R''=R/12.92$$
$$G''=G/12.92$$
$$B''=B/12.92 \quad \text{Equations (2)}$$

If R', G', B'>0.04045, $$R''=[(R'+0.055)/1.055]^{2.4}$$
$$G''=[(G'+0.055)/1.055]^{2.4}$$
$$B''=[(B'+0.055)/1.055]^{2.4} \quad \text{Equations (3)}$$

$$|X|=|0.4124\ 0.3576\ 0.18051|\times|R''|$$
$$|Y|=|0.2126\ 0.7152\ 0.07221|\times|G''|$$
$$|Z|=|0.0193\ 0.1192\ 0.95051|\times|B''| \quad \text{Equations (4)}$$

X/Xn, Y/Yn, Z/Zn>0.008856

$$L^*=116(Y/Yn)^{1/3}-16$$
$$a^*=500[(X/Xn)^{1/3}-(Y/Yn)^{1/3}]$$
$$b^*=200[(Y/Yn)^{1/3}-(Z/Zn)^{1/3}] \quad \text{Equations (5)}$$

Here, (X/Xn), (Y/Yn), (Z/Zn)>0.008856.
X, Y, and Z denote tristimulus values of a sample in XYZ color specification system, and Xn, Yn, and Zn denote tristimulus values of a perfect reflecting diffuser.

If (X/Xn), (Y/Yn), (Z/Zn)<0.008856, Equations (5) are replaced with the following expressions (6):

$$(X/Xn)^{1/3} \rightarrow 7.787(X/Xn)+16/116$$
$$(Y/Yn)^{1/3} \rightarrow 7.787(Y/Yn)+16/116$$
$$(Z/Zn)^{1/3} \rightarrow 7.787(Z/Zn)+16/116 \quad \text{Expressions (6)}$$

Next, spectrum S(u', v') is determined by computing the Fourier transform of L* using the following equation (7). Then, power spectrum P(u', v') is determined using the following equation (8).

$$S(u',v')=\Sigma\Sigma L^*(u',v')\exp(-j2\pi u'n/N)\exp(-j2\pi v'm/M) \quad \text{Equation (7)}$$

Here, the first Σ denotes the sum from m=0 to m=M−1, and the second Σ denotes the sum from n=0 to n=N−1.

$$P(u',v')=|S(u',v')|2 \quad \text{Equation (8)}$$

In the present embodiment, because a single determination area has a size of an eight-by-eight matrix of pixels, N=M=8. In the following description, only N is used.

Next, the counter v' in a spatial frequency range is set to "0," and then the counter u' is also initialized to "0." Then, the spatial frequencies u and v are calculated using the following equations (9). Next, power spectrum P'(u, v) is calculated by multiplying the power spectrum P(u', v') for the spatial frequencies (u, v) by VTF given by equation (10).

$$u=u'(dpi/N/25.4)(\pi R/180),\ 0 \le u \le N/2$$
$$v=v'(dpi/N/25.4)(\pi R/180),\ 0 \le v \le N/2$$
$$u=(u'-N)(dpi/N/25.4)(\pi R/180),\ N/2+1 \le u \le N-1$$
$$v=(v'-N)(dpi/N/25.4)(\pi R/180),\ N/2+1 \le v \le N-1 \quad \text{Equations (9)}$$

$$VTF(f)=5.05\exp(-0.138f)(1-\exp(-0.1f)) \quad \text{Equation (10)}$$

Here, f denotes spatial frequency (cycles/degree), and $$f=\sqrt{(u^2+v^2)} \quad \text{Equation (11)}$$

In the above equations, dpi indicates the input resolution, N indicates the number of pixels in a row or column (=8), and R indicates the distance of distinct vision (300 mm). The unit of the spatial frequency f is (cycles/degree). The spatial frequency f is calculated using the above equation (11).

Figure 9A:
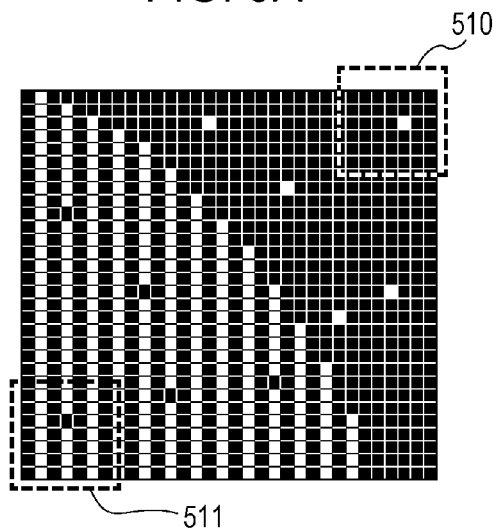
FIGS. 9A to 9E are illustrations for describing a spatial frequency analysis according to the embodiment.
Figure 9B:
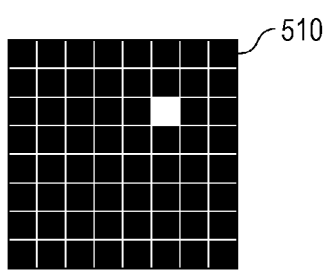
Figure 9C:
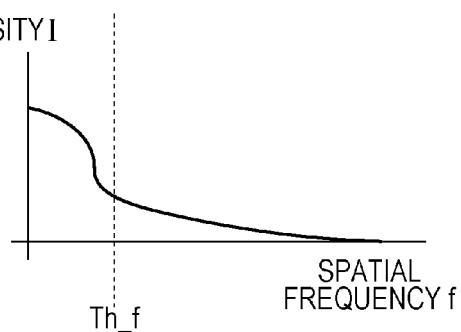
Figure 9D:
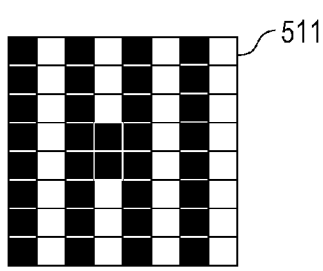

FIGS. 9A to 9E schematically illustrate a process in conducting the above-described spatial frequency analysis on an image. For the sake of simplification, a case where the RGB values (R, G, B) of multi-valued data in each pixel are either (0, 0, 0) or (255, 255, 255) is described. In FIGS. 9A, 9B, and 9D, the locations indicated by the open squares denote the pixels in which (R, G, B)=(255, 255, 255), and the locations indicated by the filled squares denote the pixels in which (R, G, B)=(0, 0, 0). For the sake of simplification, only two determination areas 510 and 511 in a unit area illustrated in FIG. 9A are described.

Here, in the first determination area 510, where almost all pixels within that determination area are the pixels in which (R, G, B)=(0, 0, 0), illustrated in FIG. 9B, the intensity is high in relatively low spatial frequencies, as illustrated in FIG. 9C. Thus, the integrated value of the intensity in spatial frequencies equal to or higher than a predetermined threshold (at or above Th_f) is smaller than that in spatial frequencies lower than the predetermined threshold (below Th_f). The predetermined threshold Th_f can be calculated by conducting the above-described spatial frequency analysis on mask patterns used in the present embodiment, as described later.

Figure 9E:
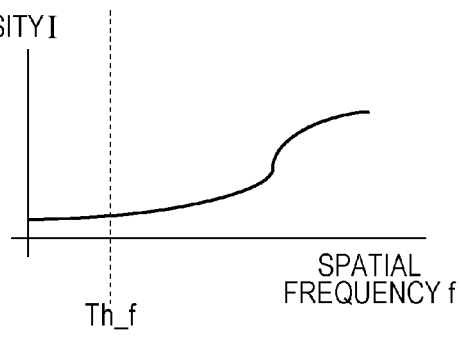

In the second determination area 511, where the pixels in which (R, G, B)=(0, 0, 0) and the pixels in which (R, G, B)=(255, 255, 255) are both present, illustrated in FIG. 9D, the intensity is high in relatively higher spatial frequencies, as illustrated in FIG. 9E. Thus, the integrated value of the intensity in spatial frequencies equal to or higher than the predetermined threshold Th_f, which is described later, is larger than that in spatial frequencies lower than the predetermined threshold Th_f.

Thus, in the present embodiment, the above-described spatial frequency analysis is conducted on each determination area, and spatial frequencies are obtained. If the integrated value of the intensity in spatial frequencies equal to or higher than the predetermined threshold Th_f of the obtained spatial frequencies is equal to or larger than that in spatial frequencies lower than the predetermined threshold Th_f, the attribute of the image in that determination area is identified as the first attribute (fine-line image). If the integrated value of the intensity in spatial frequencies lower than the predetermined threshold Th_f is equal to or larger than that in spatial frequencies equal to or higher than the predetermined threshold Th_f, the attribute of the image in that determination area is identified as the second attribute (graphical image).

In the present embodiment, degradation in image quality is suppressed by controlling the connectivity of dots in accordance with the attribute obtained by conducting the above-described spatial frequency analysis. The connectivity of dots is described below.

Figure 10A:
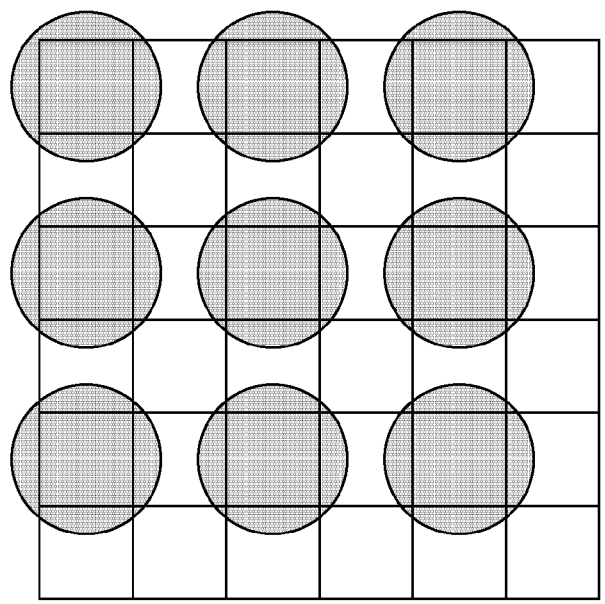
FIGS. 10A and 10B are illustrations for describing definition of the connectivity of dots according to the embodiment.
Figure 10B:
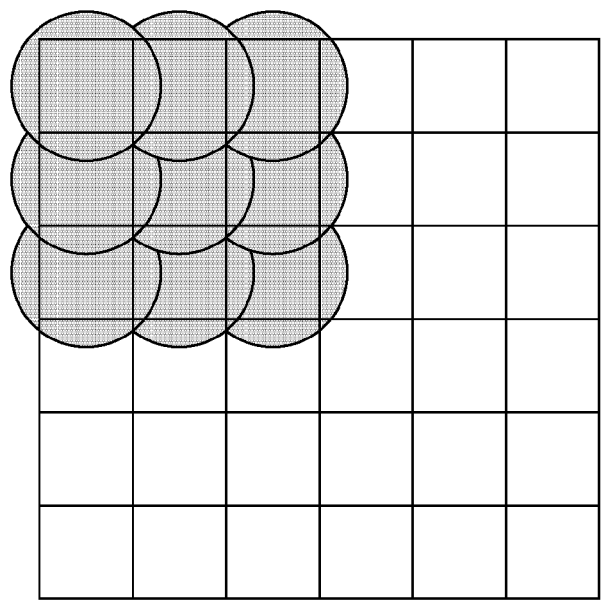
Figure 14A:
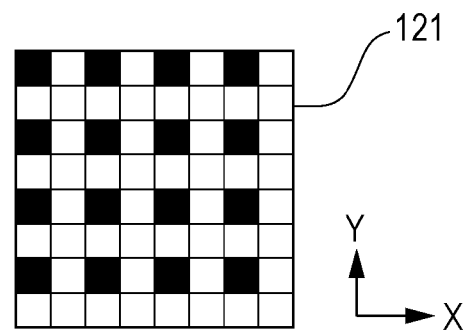
FIGS. 14A to 14D are schematic diagrams that illustrate mask patterns used in the embodiment.
Figure 14B:
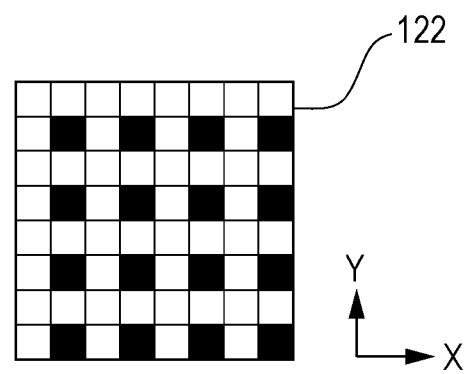
Figure 14C:
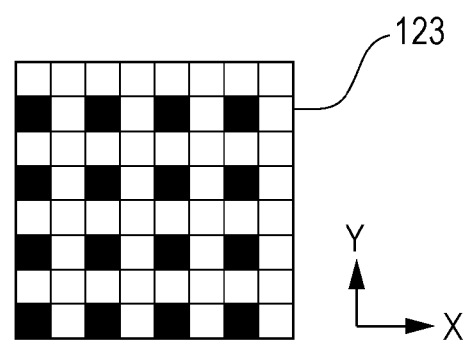
Figure 14D:
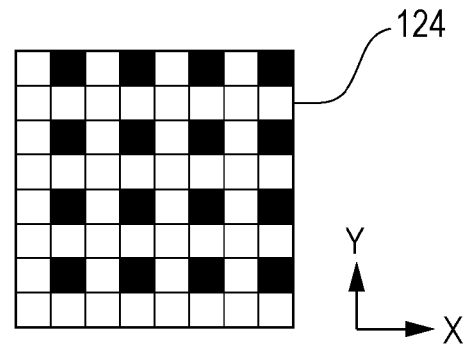

FIGS. 10A and 10B are illustrations for describing the connectivity of dots in the present embodiment. The circles illustrated in FIGS. 10A and 10B indicate dots provided in the same scan.

The connectivity of dots in the present embodiment can be assessed based on a numerical form obtained by measuring the number of connected dots forming a large dot among a plurality of dots discharged in an area and calculating a mean of the numbers of connected dots in that area.

For example, nine dots illustrated in FIG. 10A are formed in locations spaced away from one another in a single scan, and there are no connected dots within an area of a six-by-six matrix of pixels. Thus, the numbers of connected dots for all dots within that area are one. Accordingly, the connectivity of dots, which is the mean of the numbers of connected dots in that area, is assessed at one.

For nine dots illustrated in FIG. 10B, they are formed in locations in contact with one another in a single scan, are connected together after being provided on a printing medium, and form a large dot. The number of connected dots for that large dot is assessed at nine. Except for that large dot, no large dots exist within the area of the six-by-six matrix of pixels. Thus, the connectivity of dots, which is the mean of the numbers of connected dots in that area, is assessed at nine.

In the present embodiment, in order to control the connectivity of dots, when each of a print permitting pixel group consisting of a plurality of adjacent print permitting pixels and a print permitting pixel that is not adjacent to the other print permitting pixels is defined as a single unit (hereinafter also referred to simply as unit), mask patterns having different means of the numbers of print permitting pixels in the units are used.

FIGS. 11A to 11D are illustrations for describing definition of the units and the number of print permitting pixels in each of the units in the present embodiment.

As described above, a print permitting pixel group consists of a plurality of print permitting pixels arranged in adjacent locations. One example is illustrated in FIG. 11A. In this example, a print permitting pixel group consists of four pixels arranged in a two-by-two matrix and has a square shape. In this case, the number of print permitting pixels in the unit is four.

In the present embodiment, a print permitting pixel that is not adjacent to any other print permitting pixels can also be referred to as a unit. FIG. 11B illustrates such a print permitting pixel that is not adjacent to any print permitting pixel. In this case, the number of print permitting pixels in the unit is one.

A plurality of print permitting pixels that are contiguous and unevenly extend in a specific direction can also constitute a print permitting pixel group in the present embodiment. That is, the print permitting pixel group is not limited to isotropic shapes, one example of which is illustrated in FIG. 11A. FIG. 11C illustrates an L-shaped print permitting pixel group, which are contiguous and unevenly extend in specific directions. In this case, the number of print permitting pixels in the unit is seven.

Examples of contiguous print permitting pixels in the present embodiment include not only print permitting pixels contiguous in the X and Y directions, but also print permitting pixels contiguous in a slanting direction. That is, a single print permitting pixel may be adjacent to two pixels in the X direction, two pixels in the Y direction, and four pixels in the slanting directions, or a total of eight print permitting pixels. FIG. 11D illustrates a print permitting pixel group consisting of print permitting pixels adjacent in the slanting directions. In this case, the number of print permitting pixels in the unit is five.

FIGS. 12A and 12B are illustrations for describing a method for calculating a mean of the numbers of print permitting pixels in units according to the present embodiment.

In the present embodiment, for the sake of simplification, a mean of the numbers of print permitting pixels in units in an assessment area consisting of a predetermined number of pixels in a unit area, and the obtained value is used as the mean of the numbers of print permitting pixels in units. FIGS. 12A and 12B illustrate an area of 25 pixels arranged in a matrix of 5 pixels in the X direction by 5 pixels in the Y direction, as an example area in a mask pattern corresponding to an assessment area for use in calculating the mean of the numbers of print permitting pixels in units. The mean of the numbers of print permitting pixels in units in the present embodiment is obtained as described below. First, the number of units contained in an area in a mask pattern corresponding to an assessment area is calculated. Then, the number of print permitting pixels in each unit in the mask pattern corresponding to that assessment area is calculated. Further, the sum of the numbers of print permitting pixels in the units is calculated, that sum is divided by the number of the units, and thus the quotient is obtained as the mean of the numbers of print permitting pixels in the units in the mask pattern.

For example, there are no adjacent print permitting pixels in the area in the mask pattern corresponding to the assessment area illustrated in FIG. 12A. In other words in accordance with the above-described definition, a total of eight units each having one print permitting pixel in the unit are arranged. Accordingly, the mean of the numbers of print permitting pixels in the units in the mask pattern illustrated in FIG. 12A is one, which is the value obtained by dividing eight, which is the sum of the numbers of print permitting pixels in the units (=1×8), by eight, which is the number of the units.

In the area in the mask pattern corresponding to the assessment area illustrated in FIG. 12B, units T1 and T2 for print permitting pixels are configured. Each of the units T1 and T2 consists of four adjacent print permitting pixels. Accordingly, the mean of the numbers of print permitting pixels in the units in the mask pattern illustrated in FIG. 12B is four, which is the value obtained by dividing eight, which is the sum of the numbers of print permitting pixels in the units (=4×2), by two, which is the number of the units.

In the present embodiment, when the attribute of the image is the second attribute (graphics), in order to suppress a decrease in glossiness, mask patterns in which the mean of the numbers of print permitting pixels in units is relatively large are used, the connectivity of dots is made relatively high, and printing is performed. In contrast, when the image has the first attribute (fine line), in order to suppress degradation in image quality of the fine-line image, mask patterns in which the mean of the numbers of print permitting pixels in units is relatively small are used, the connectivity of dots is made relatively low, and printing is performed.

Here, an estimating mechanism capable of suppressing degradation in image quality by reducing the connectivity of dots for the first attribute is described in detail.

FIGS. 13A to 13E are illustrations for describing a process in printing an image by making the connectivity of dots relatively low by using mask patterns in which the number of adjacent print permitting pixels is relatively small (the mean of the numbers of print permitting pixels in units is relatively small) for the first attribute.

FIG. 13A schematically illustrates binary data corresponding to a fine-line image. Here, a case where the six pixels 700 to which ink is to be discharged are aligned in the X direction is processed, as in the case of the binary data illustrated in FIG. 1A, is described.

FIGS. 13B1 to 13B4 illustrate mask patterns corresponding to first to fourth scans, respectively, on a unit area. Here, in the mask pattern corresponding to the first scan illustrated in FIG. 13B1, each of the print permitting pixels 711 is not adjacent to any other print permitting pixels 711. That is, the mean of the numbers of print permitting pixels in units in the mask pattern illustrated in FIG. 13B1 is one. In each of the mask patterns illustrated in FIGS. 13B2 to 13B4, the mean of the numbers of print permitting pixels in units is also one. In the mask patterns illustrated in FIGS. 13B1 to 13B4, the print permitting pixels 711, 712, 713, and 714 are arranged in an exclusive and complementary manner. The binary data illustrated in FIG. 13A is allocated to four scans by using these mask patterns.

FIG. 13C schematically illustrates print data generated based on the binary data illustrated in FIG. 13A and the mask patterns illustrated in FIGS. 13B1 to 13B4. According to the print data illustrated in FIG. 13C, ink is to be discharged to a pixel 715 of the six pixels to which ink is to be discharged illustrated in FIG. 13A in the first scan. The pixel 715 corresponds to the print permitting pixels 711 in the mask pattern illustrated in FIG. 13B1. Similarly, ink is to be discharged to pixels 716, 717, and 718 corresponding to the print permitting pixels 712, 713, and 714, respectively, in the mask patterns illustrated in FIGS. 13B2, 13B3, and 13B4 in the second, third, and fourth scans, respectively.

FIG. 13D illustrates an image printed when the second scan is performed on the unit area and ink is discharged in accordance with the print data schematically illustrated in FIG. 13C. At the time of the second scan, a dot 720 has been already formed by ink discharged to a pixel area corresponding to the pixel 715 illustrated in FIG. 13C. In the second scan, ink droplets 721 are provided to pixel areas corresponding to the pixels 716 illustrated in FIG. 13C. Because the ink droplets 721 are provided to spaced locations where they are not in contact with each other, they are not drawn to each other. Thus, the ink droplet 721 can be fixed on the printing medium without unevenly moving to a specific direction.

FIG. 13E illustrates an image printed when the fourth scan is completed and ink is discharged in accordance with the print data schematically illustrated in FIG. 13C. When ink is discharged in accordance with the print data illustrated in FIG. 13C, ink droplets are provided in locations that are not adjacent to each other in one scan for any of the first to fourth scans. Thus, the ink droplets provided in any of the scans are fixed without unevenly extending in a specific direction, and dots 722 are formed without deviation, and the image having no paper blank portions is printed.

As described above, when the image has the first attribute (fine line), the use of mask patterns in which the number of adjacent print permitting pixels is relatively small (the mean of the numbers of print permitting pixels in units is relatively small) enables printing with suppressed degradation in image quality in the fine-line image.

The details are described below with reference to the diagram illustrated in FIG. 8. When it is determined in attribute determination processing step S30 that the attribute of the image obtained by spatial frequency analysis conducted on multi-valued data corresponding to a determination area is the first attribute (fine line), binary data corresponding to that determination area generated in binarization processing step S32 is sent to mask pattern A setting processing step S34, and the mask patterns in which the number of adjacent print permitting pixels is relatively small are set. In contrast, when it is determined in attribute determination processing step S30 that the attribute of the image obtained by spatial frequency analysis conducted on multi-valued data corresponding to a determination area is the second attribute (graphics), binary data corresponding to that determination area generated in binarization processing step S32 is sent to mask pattern B setting processing step S35, and the mask patterns in which the number of adjacent print permitting pixels is relatively large are set.

FIGS. 14A to 14D and 15A to 15D illustrate mask patterns used in the present embodiment. FIGS. 14A to 14D illustrate mask patterns used in mask pattern A setting processing step S34 when it is determined in attribute determination processing step S30 that the attribute of the image corresponding to the determination area is the first attribute (fine line). The mask patterns illustrated in FIGS. 14A to 14D correspond to the first to fourth scans, respectively. FIGS. 15A to 15D illustrate mask patterns used in mask pattern B setting processing step S35 when it is determined in attribute determination processing step S30 that the attribute of the image corresponding to the determination area is the second attribute (graphics). The mask patterns illustrated in FIGS. 15A to 15D correspond to the first to fourth scans, respectively.

Here, substantially the same number of print permitting pixels are arranged in each of mask patterns 121 to 124. The print permitting pixels in the mask patterns 121 to 124 lie in mutually different locations where the logical sum of them is all pixels.

The use of the above-described mask patterns enables ink to be discharged by substantially the same amount in the first to fourth print scans when the image has the first attribute (fine line). It also enables ink to be provided to all dischargeable pixel areas in a unit area on a printing medium by the first to fourth print scans.

These respects are common to mask patterns 131 to 134 used when the image has the second attribute (graphics).

The mean of the numbers of print permitting pixels in units calculated in accordance with the above-described definition in each of the mask patterns 121 to 124 corresponding to the first attribute (fine line) is one.

In contrast, the mean of the numbers of print permitting pixels in units calculated in accordance with the above-described definition in each of the mask patterns 131 to 134 corresponding to the second attribute (graphics) is four. Thus, the print permitting pixels are arranged in each of the mask patterns 131 to 134 corresponding to the second attribute (graphics) such that the mean of the numbers of print permitting pixels in units is larger than that in any of the mask patterns 121 to 124 corresponding to the first attribute (character).

The above-described predetermined threshold in FIGS. 9C and 9E can be obtained by spatial frequency analysis conducted on any one of the mask patterns in which the number of print permitting pixels in a unit is relatively large illustrated in FIGS. 15A to 15D. For example, in spatial frequency analysis conducted on the mask pattern 131 illustrated in FIG. 15A, the pixels in which (R, G, B)=(0, 0, 0) are regarded as the print permitting pixels, whereas the pixels in which (R, G, B)=(255, 255, 255) are regarded as the non-print permitting pixels.

Figure 16:
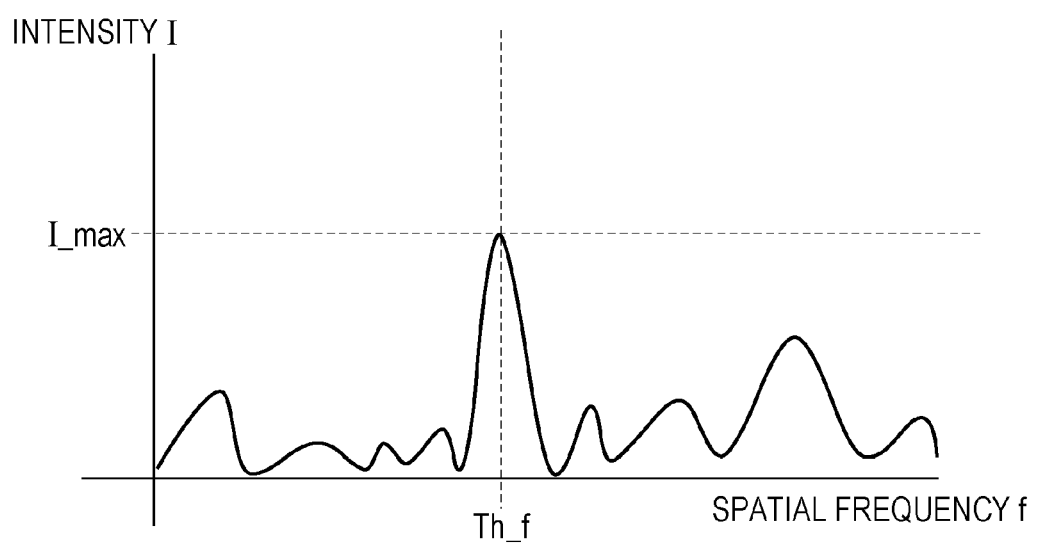
FIG. 16 is an illustration for describing a method for calculating a predetermined threshold according to the embodiment.

FIG. 16 is a conceptual diagram that illustrates the spatial frequencies and intensities obtained in the above-described manner.

Figure 15A:
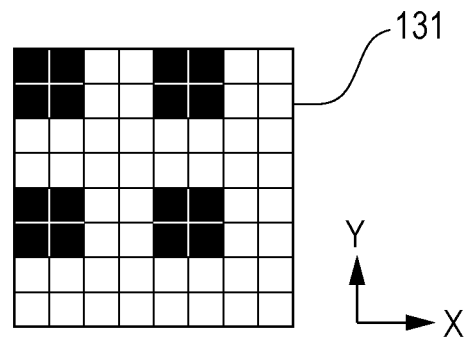
FIGS. 15A to 15D are schematic diagrams that illustrate mask patterns used in the embodiment.
Figure 15B:
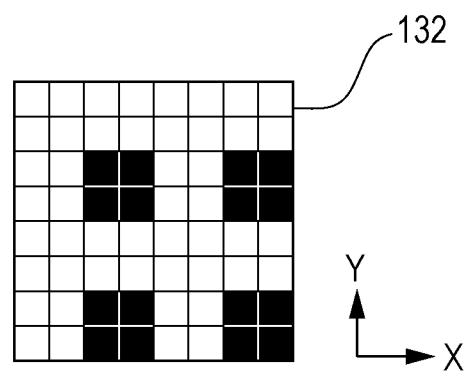
Figure 15C:
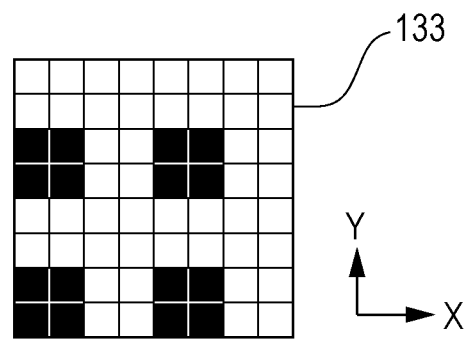
Figure 15D:
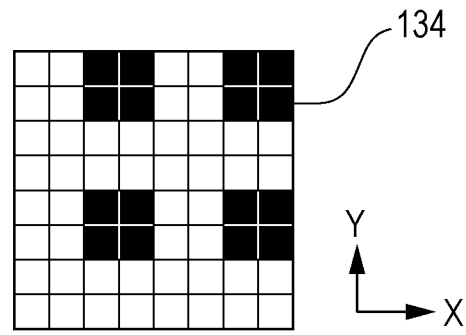

In the present embodiment, of the spatial frequencies, the value of a spatial frequency at which the intensity is the highest ($I\_max$) is used as the predetermined threshold $Th\_f$. This makes it possible to perform the attribute determination processing in association with the number of adjacent print permitting pixels in the mask pattern 131 illustrated in FIG. 15A for spatial frequency analysis conducted on RGB-format multi-valued data. Specifically, because the number of adjacent print permitting pixels in the X direction or Y direction in the mask pattern 131 illustrated in FIG. 15A is two, when the number of adjacent pixels to which ink is to be discharged is two or less, the attribute can be identified as the first attribute (character), and when it is three or more, the attribute can be identified as the second attribute (graphics).

With the above-described configuration, when the image has the first attribute (fine line), degradation in image quality of the fine-line image can be suppressed because the image can be printed with a reduced connectivity of dots. In contrast, when the image has the second attribute (graphics), printing with a suppressed decrease in glossiness can be performed because the image can be printed with an increased connectivity of dots.

Second Embodiment

In the first embodiment, spatial frequency analysis is used in determining whether the attribute of the image is graphics or a fine line.

In contrast, in the present embodiment, an object is determined for each pixel corresponding to each pixel area in a unit area, and it is determined whether the attribute in each pixel is graphics or a character based on a fine line.

The same parts as in the above-described first embodiment are not described here.

In the present embodiment, the type of image data input from the host PC 312 is classified for each object in attribute determination processing step S30. Specifically, when an object in a pixel is identified as a character object corresponding to a character image, the attribute of the image in that pixel is identified as the first attribute (character). In contrast, when an object in a pixel is identified as a graphical object corresponding to a graphical image, such as a picture, the attribute of the image in that pixel is identified as the second attribute (graphics).

Figure 17:
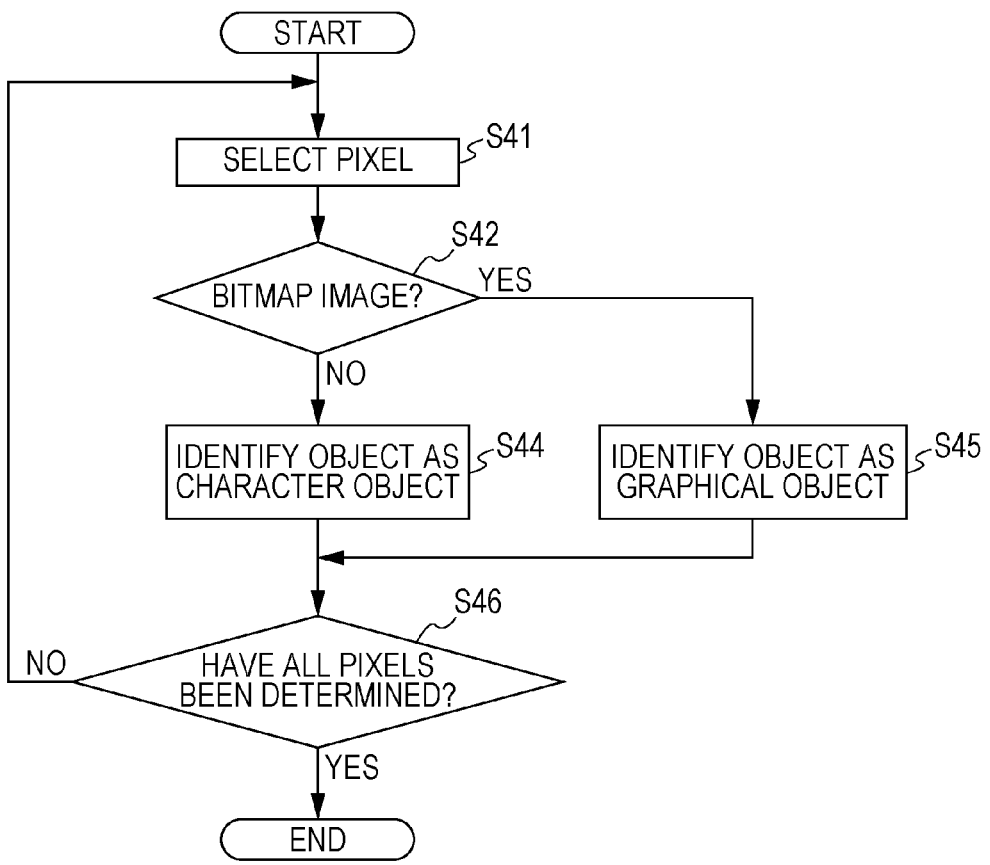
FIG. 17 is a diagram for describing a PDL determining process according to another embodiment.

FIG. 17 illustrates the details of a process in attribute determination processing step S30 illustrated in FIG. 8 in the present embodiment.

First, one pixel is selected from an image in pixel selection processing step S41.

Next, it is determined in PDL determination processing step S42 whether an object in that pixel is a bitmap image or not (bitmap format or a format other than the bitmap format). Typically, in page description language (PDL), a graphical image, such as a picture, is described in bitmap format, whereas a character image is described in the form of a vector image or the form of character code and font information. Thus, the determination whether the object is a bitmap image or not based on the data described in PDL enables determination whether the image in the pixel has the first attribute (character) or the second attribute (graphics).

When it is determined in PDL determination processing step S42 that the object is not a bitmap image, the object is identified as a character object in character object identification processing step S44. When it is determined in PDL determination processing step S42 that the object is a bitmap image, the object is identified as a graphical object in graphical object identification processing step S45.

After the completion of character object identification processing step S44 or graphical object identification processing step S45, it is determined in step S46 whether the PDL determination processing has been performed on all of the objects. When there remains an object that has not been subjected to the PDL determination processing yet, the process returns to pixel selection processing step S41, and the same processing is performed on the next pixel. When the PDL determination processing has been performed on all pixels, the attribute determination processing is completed.

Next, in mask selection processing step S33 illustrated in FIG. 8, when it is determined in attribute determination processing step S30 that the object in a pixel is a character object, binary data corresponding to that object generated in binarization processing step S32 is sent to mask pattern A setting processing step S34. When it is determined in attribute determination processing step S30 that the object in a pixel is a graphical object, binary data corresponding to that object generated in binarization processing step S32 is sent to mask pattern B setting processing step S35.

In mask pattern A setting processing step S34, the binary data is allocated to the first to fourth print scans by using the mask patterns in which the number of adjacent print permitting pixels is relatively small illustrated in FIGS. 14A to 14D. In mask pattern B setting processing step S35, the binary data is allocated to the first to fourth print scans by using the mask patterns in which the number of adjacent print permitting pixels is relatively large illustrated in FIGS. 15A to 15D.

In addition, in print data generation processing step S36, the binary data corresponding to each object and allocated to the four scans in mask pattern A setting processing step S34 or mask pattern B setting processing step S35 are combined to generate print data.

With the above-described configuration, the determination of the object for each pixel enables determining the attribute of the image in each pixel. The connectivity of dots can be controlled in accordance with the attribute of the image for each object. This enables printing with suppressed degradation in image quality of a fine-line image and suppressed decrease in granularity of a graphical image.

Third Embodiment

In a third embodiment, after binary data is generated, the attribute of the image is directly determined based on the binary data for each determination area.

The same parts as in the above-described first and second embodiments are not described here.

FIGS. 18A to 18D are illustrations for describing attribute determination processing according to the present embodiment.

In the present embodiment, when the maximum number of binary data indicating that ink is to be discharged and being adjacent in either the X direction or Y direction in a determination area of an eight-by-eight matrix of pixels is two or less, it is determined that the image in that determination area has the first attribute (fine line). In contrast, when the maximum number of binary data indicating that ink is to be discharged and being adjacent in the X direction and that in the Y direction are both three or more, it is determined that the image in that determination area has the second attribute (graphics).

Figure 18A:
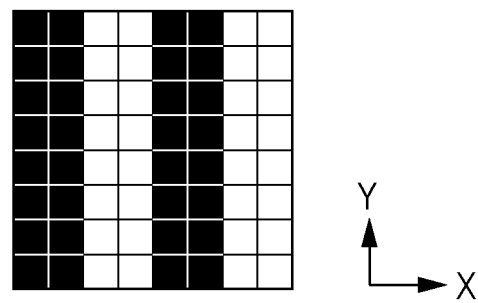
FIGS. 18A to 18D are illustrations for describing an attribute determining process based on binary data according to another embodiment.

For example, in the binary data illustrated in FIG. 18A, the maximum number of binary data indicating that ink is to be discharged and being adjacent in the X direction is two, and the maximum number of binary data indicating that ink is to be discharged and being adjacent in the Y direction is eight. Thus, it is determined that the image corresponding to the binary data illustrated in FIG. 18A is the first attribute (fine line).

Figure 18B:
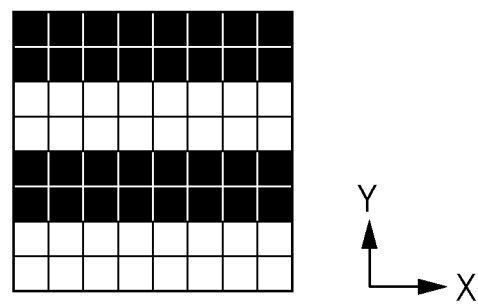

In the binary data illustrated in FIG. 18B, the maximum number of binary data indicating that ink is to be discharged and being adjacent in the X direction is eight, and the maximum number of binary data indicating that ink is to be discharged and being adjacent in the Y direction is two. Thus, it is determined that the image corresponding to the binary data illustrated in FIG. 18B is the first attribute (fine line).

Figure 18C:
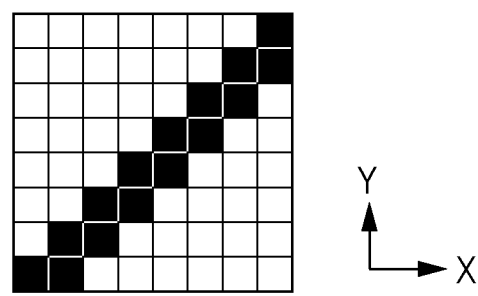

In the binary data illustrated in FIG. 18C, the maximum number of binary data indicating that ink is to be discharged and being adjacent in the X direction is two, and the maximum number of binary data elements indicating that ink is to be discharged and being adjacent in the Y direction is two.

Thus, it is determined that the image corresponding to the binary data illustrated in FIG. 18C is the first attribute (fine line).

Figure 18D:
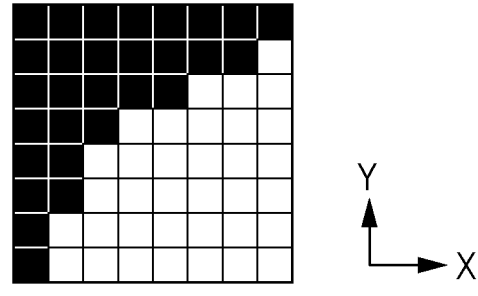
Figure 19A:
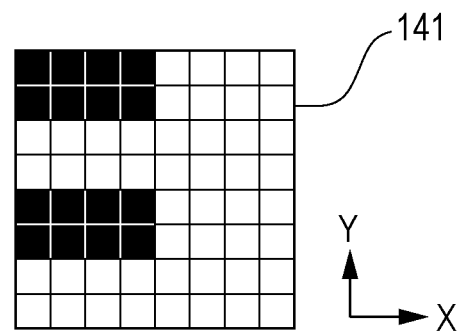
FIGS. 19A to 19D are schematic diagrams that illustrate mask patterns used in another embodiment.
Figure 19B:
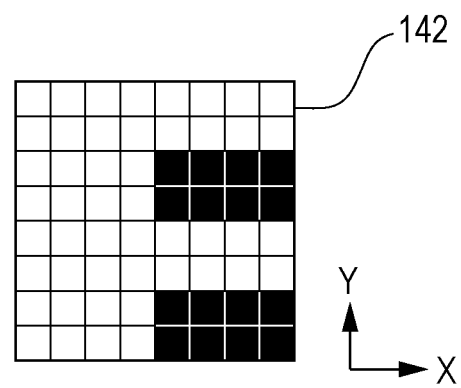
Figure 19C:
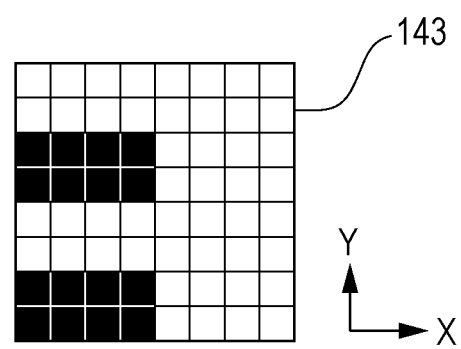
Figure 19D:
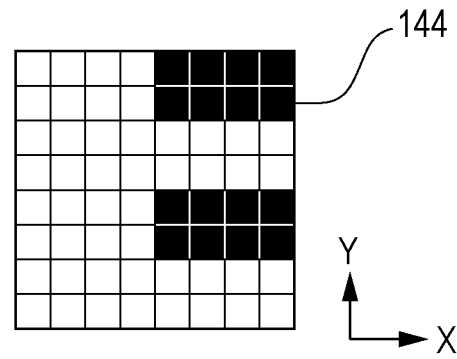

In contrast, in the binary data illustrated in FIG. 18D, the maximum number of binary data indicating that ink is to be discharged and being adjacent in the X direction is eight, and the maximum number of binary data indicating that ink is to be discharged and being adjacent in the Y direction is eight. Thus, it is determined that the image corresponding to the binary data illustrated in FIG. 18D is the second attribute (graphics).

The image is printed while the connectivity of dots is controlled based on the attribute of the image determined in the above-described way, as in the case of the first embodiment. Specifically, when the binary data illustrated in FIG. 18A, 18B, or 18C is generated in a determination area, because it possesses the first attribute, that binary data is allocated to the four scans by using the mask patterns illustrated in FIGS. 14A to 14D. In contrast, when the binary data illustrated in FIG. 18D is generated, it possesses the second attribute, that binary data is allocated to the four scans by using the mask patterns illustrated in FIGS. 15A to 15D.

With the above-described configuration, the attribute of an image is determined based on binary data, and thus it can be determined more correctly.

In the present embodiment, the threshold of the maximum number of binary data indicating that ink is to be discharged and being adjacent in the X direction or Y direction is two. This threshold may be a different value, depending on the used ink, printing medium, or the like.

Fourth Embodiment

In the above embodiments, mask patterns having different numbers of adjacent print permitting pixels are used in the case where the image has the first attribute (fine line) and in the case where the image has the second attribute (graphics).

In contrast, in a fourth embodiment, a different mask pattern is also used in the case where the image has a third attribute (extra-fine line).

The same parts as in the above-described first to third embodiments are not described here.

In the present embodiment, the attribute of an image is determined based on binary data, as in the case of the third embodiment.

In the present embodiment, when the maximum number of binary data indicating that ink is to be discharged and being adjacent in either the X direction or Y direction in a determination area of an eight-by-eight matrix of pixels is two, it is determined that the image in that determination area has the first attribute (fine line). In contrast, when the maximum number of binary data indicating that ink is to be discharged and being adjacent in the X direction and that in the Y direction are both three or more, it is determined that the image in that determination area has the second attribute (graphics). In addition, when the maximum number of binary data indicating that ink is to be discharged and being adjacent in the X direction and that in the Y direction are both one, it is determined that the image in that determination area has the third attribute (extra-fine line).

In the present embodiment, the image is printed such that the connectivity of dots is controlled based on the attribute of the image determined in the above-described way, as in the case of the first embodiment. Specifically, when it is determined that an image corresponding to binary data in a determination area has the first attribute (fine line), the binary data is allocated to four scans by using the mask patterns illustrated in FIGS. 15A to 15D. In contrast, when it is determined that an image corresponding to binary data in a determination area has the second attribute (graphics), the binary data is allocated to four scans by using mask patterns illustrated in FIGS. 19A to 19D. In addition, when it is determined that an image corresponding to binary data in a determination area has the third attribute (extra-fine line), the binary data is allocated to four scans by using the mask patterns illustrated in FIGS. 14A to 14D.

Here, the mean of the numbers of print permitting pixels in units in each of the mask patterns 131 to 134 illustrated in FIGS. 15A to 15D corresponding to the first attribute (fine line) is four. The mean of the numbers of print permitting pixels in units in each of the mask patterns 121 to 124 illustrated in FIGS. 14A to 14D corresponding to the third attribute (extra-fine line) is one. The mean of the numbers of print permitting pixels in units in each of mask patterns 141 to 144 illustrated in FIGS. 19A to 19D corresponding to the second attribute (graphics) is eight.

That is, according to the present embodiment, when the image has the third attribute (extra-fine line), the connectivity of dots can be reduced; when it has the first attribute (fine line), the connectivity of dots can be intermediate; and when it has the second attribute (graphics), the connectivity of dots can be increased. This enables printing with more effectively suppressed degradation in image quality and in granularity.

Fifth Embodiment

The image processing method in the first to fourth embodiments is the one for use in a printing apparatus for printing an image by performing a plurality of print scans in a unit area on a printing medium, using so-called multipass printing method.

In contrast, in a fifth embodiment, an image processing method is the one for use in a printing apparatus including a plurality of print heads for respective inks and each having a length that matches the full width of a printing medium. The printing apparatus prints an image by performing a single print scan relatively performed for the print heads and the printing medium.

The same parts as in the above-described first to fourth embodiments are not described here.

Figure 20:
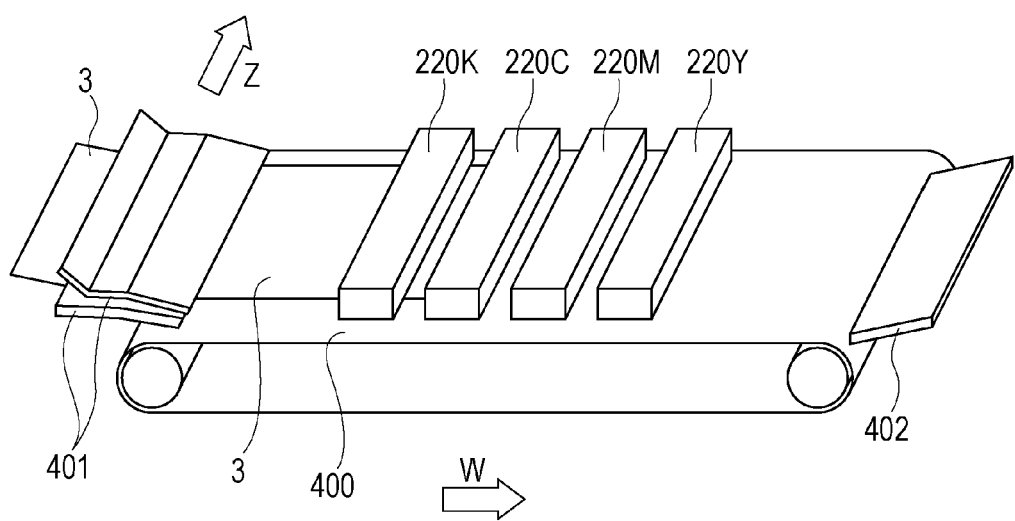
FIG. 20 is a perspective view of an image printing apparatus according to another embodiment.

FIG. 20 is a perspective view that illustrates a configuration of the printing apparatus according to the present embodiment.

Each of four print heads 220K, 220C, 220M, and 220Y has four discharge opening arrays (not illustrated) having a predetermined number of discharge openings (not illustrated) arranged in a Z direction. The discharge openings in the print heads 220K, 220C, 220M, and 220Y allow black ink, cyan ink, magenta ink, and yellow ink, respectively, to be discharged therethrough. The length of each of the discharge opening arrays in the Z direction is equal to or longer than the length of the printing medium 3 in the Z direction so that images can be printed across the printing medium 3 in the Z direction.

A conveyance belt 400 is a belt for conveying the printing medium 3. The conveyance belt 400 is rotated in a W direction substantially perpendicular to the Z direction by a feeding section 401 and an ejecting section 402.

The printing medium 3 is fed by the feeding section 401, and it is conveyed by the conveyance belt 400 in the W direction.

This image printing apparatus can complete an image by a single print scan and thus can achieve reduction in printing time.

In the present embodiment, binary data is generated by substantially the same image processing process as that illustrated in FIG. 8. When it is determined that the attribute of an image corresponding to a determination area is the first attribute (fine line), the binary data is allocated to the four discharge opening arrays for discharging ink of the same color by using the mask patterns illustrated in FIGS. 14A to 14D. In contrast, when it is determined that the attribute of the image corresponding to the determination area is the second attribute (graphics), the binary data is allocated to the four discharge opening arrays for discharging ink of the same color by using the mask patterns illustrated in FIGS. 15A to 15D.

With the above-described configuration, the printing apparatus for printing an image by a single print scan on a unit area in a printing medium can perform printing while suppressing degradation in image quality of a fine-line image and a decrease in granularity in a graphical image.

The discharge opening array in the Z direction used in the present embodiment has a length similar to the width of the printing medium. The print head may be a head in which a plurality of short discharge opening arrays are arranged in the Z direction to have a long length, a so-called connected print head, may also be used.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The inkjet printing apparatus and printing method in the above-described embodiments are of the thermal inkjet type, which discharges ink using energy of bubbling caused by heating. The present invention is not limited to the thermal inkjet printing apparatus. The present invention is also effectively applicable to various image printing apparatuses, including a piezoelectric inkjet printing apparatus, which discharges ink using piezoelectric transducers.

In the above-described embodiments, cyan, magenta, yellow, and black inks are used. Other embodiments are also possible. For example, light cyan and light magenta inks can also be used. In an embodiment that uses a white ink, when a fine line or character is printed using a chromatic color ink in an area where the white ink is discharged, degradation in image quality of the fine line or character may be particularly noticeable. Thus, the advantages of the present invention can be suitably obtained when the white ink is used.

In the above-described embodiments, the image printing method uses the image printing apparatus. The present invention is also applicable to an embodiment in which an image processing apparatus, image processing method, or program for generating data for executing the image printing method in the above-described embodiments is prepared separately from the image printing apparatus. The present invention is also widely applicable to embodiments in which such an image processing apparatus or program or both are included in a part of the image printing apparatus.

According to the image printing apparatus, image printing method, and image processing apparatus in an aspect of the present invention, images can be printed while the glossiness of the images is maintained and degradation in image quality is suitably suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094814, filed May 1, 2014, which is hereby incorporated by reference herein in its entirety.

What is claimed is:

1. An image printing apparatus comprising:
a printing control unit configured to print an image in a unit area on a printing medium by performing a plurality of scans relatively in a scan direction by a print head for discharging ink on the unit area in accordance with print data that specifies whether the ink is to be discharged or not to each of a plurality of pixel areas corresponding to a plurality of pixels in the unit area in each of the plurality of scans;
a determining unit configured to determine an attribute of the image to be printed in each of a plurality of determination areas obtained by division of the unit area;
an acquiring unit configured to acquire binary data that specifies whether the ink is to be discharged or not to each of the plurality of pixel areas in the plurality of determination areas; and
a generating unit configured to generate the plurality of print data to be used in printing in the plurality of scans based on a plurality of first mask patterns and a plurality of second mask patterns in which print permitting pixels and non-print permitting pixels are arranged and the binary data acquired by the acquiring unit, the plurality of first mask patterns and the plurality of second mask patterns corresponding to the plurality of scans, the print permitting pixels permitting ink to be discharged, the non-print permitting pixels not permitting ink to be discharged,
wherein when each of a print permitting pixel group consisting of a plurality of adjacent print permitting pixels and a print permitting pixel that is not adjacent to the other print permitting pixels in each of the mask patterns is defined as a single unit, a mean of the numbers of the print permitting pixels in the units in one mask pattern of the plurality of second mask patterns is larger than a mean of the numbers of the print permitting pixels in the units in one mask pattern of the plurality of first mask patterns, and
the generating unit is configured to generate the plurality of print data based on the plurality of first mask patterns when the determining unit determines that the attribute of the image to be printed in the determination area is a first attribute and configured to generate the plurality of print data based on the plurality of second mask patterns when the determining unit determines that the attribute of the image to be printed in the determination area is a second attribute different from the first attribute.

2. The image printing apparatus according to claim 1, wherein the mean of the numbers of the print permitting pixels in the units in each of the plurality of second mask patterns is larger than any of the means of the numbers of the print permitting pixels in the units in the plurality of first mask patterns.

3. The image printing apparatus according to claim 1, wherein substantially the same number of the print permitting pixels are arranged in each of the plurality of first mask patterns.

4. The image printing apparatus according to claim 1, wherein substantially the same number of the print permitting pixels are arranged in each of the plurality of second mask patterns.

5. The image printing apparatus according to claim 1, wherein the determining unit is configured to determine that the attribute of the image to be printed in the determination area is the first attribute when the image to be printed in the determination area is a character image or a fine-line image and configured to determine that the attribute of the image to be printed in the determination area is the second attribute when the image to be printed in the determination area is a graphical image.

6. The image printing apparatus according to claim 1, further comprising a second acquiring unit configured to acquire information on spatial frequencies for the image to be printed in the determination area,
wherein the determining unit is configured to determine that the attribute of the image to be printed in the determination area is the first attribute when an integrated value of an intensity in spatial frequencies equal to or higher than a predetermined threshold among the spatial frequencies indicated in the information acquired by the second acquiring unit is equal to or larger than an integrated value of an intensity in spatial frequencies lower than the predetermined threshold and configured to determine that the attribute of the image to be printed in the determination area is the second attribute when the integrated value of the intensity in the spatial frequencies equal to or higher than the predetermined threshold among the spatial frequencies indicated in the information acquired by the second acquiring unit is smaller than the integrated value of the intensity in the spatial frequencies lower than the predetermined threshold.

7. The image printing apparatus according to claim 6, further comprising a third acquiring unit configured to acquire information on the predetermined threshold.

8. The image printing apparatus according to claim 7, wherein the third acquiring unit is configured to acquire the information on the predetermined threshold based on the spatial frequencies for the second mask patterns.

9. The image printing apparatus according to claim 1, wherein the determining unit is configured to determine the attribute of the image based on a page description language.

10. The image printing apparatus according to claim 9, wherein the determining unit is configured to determine that the attribute of the image to be printed in the determination area is the first attribute when the page description language is described in a format other than a bitmap format and configured to determine that the attribute of the image to be printed in the determination area is the second attribute when the page description language is described in the bitmap format.

11. An image printing method for printing an image in a unit area on a printing medium by performing a plurality of scans relatively in a scan direction by a print head for discharging ink on the unit area in accordance with print data that specifies whether the ink is to be discharged or not to each of a plurality of pixel areas corresponding to a plurality of pixels in the unit area in each of the plurality of scans, the image printing method comprising:
determining an attribute of the image to be printed in each of a plurality of determination areas obtained by division of the unit area;
acquiring binary data that specifies whether the ink is to be discharged or not to each of the plurality of pixel areas in the plurality of determination areas; and
generating the plurality of print data to be used in printing in the plurality of scans based on a plurality of first mask patterns and a plurality of second mask patterns in which print permitting pixels and non-print permitting pixels are arranged and the binary data acquired in the acquiring, the plurality of first mask patterns and the plurality of second mask patterns corresponding to the plurality of scans, the print permitting pixels permitting ink to be discharged, the non-print permitting pixels not permitting ink to be discharged,
wherein when each of a print permitting pixel group consisting of a plurality of adjacent print permitting pixels and a print permitting pixel that is not adjacent to the other print permitting pixels in each of the mask patterns is defined as a single unit, a mean of the numbers of the print permitting pixels in the units in one mask pattern of the plurality of second mask patterns is larger than a mean of the numbers of the print permitting pixels in the units in one mask pattern of the plurality of first mask patterns, and
the plurality of print data are generated based on the plurality of first mask patterns when the attribute of the image to be printed in the determination area is a first attribute, and the plurality of print data are generated based on the plurality of second mask patterns when the attribute of the image to be printed in the determination area is a second attribute different from the first attribute.

12. An image processing apparatus for processing image data corresponding to an image to be printed in a unit area on a printing medium by performing a plurality of scans relatively in a scan direction by a print head for discharging ink on the unit area in accordance with print data that specifies whether the ink is to be discharged or not to each of a plurality of pixel areas corresponding to a plurality of pixels in the unit area in each of the plurality of scans, the image processing apparatus comprising:
a determining unit configured to determine an attribute of the image to be printed in each of a plurality of determination areas obtained by division of the unit area;
an acquiring unit configured to acquire binary data that specifies whether the ink is to be discharged or not to each of the plurality of pixel areas in the plurality of determination areas; and
a generating unit configured to generate the plurality of print data to be used in printing in the plurality of scans based on a plurality of first mask patterns and a plurality of second mask patterns in which print permitting pixels and non-print permitting pixels are arranged and the binary data acquired by the acquiring unit, the plurality of first mask patterns and the plurality of second mask patterns corresponding to the plurality of scans, the print permitting pixels permitting ink to be discharged, the non-print permitting pixels not permitting ink to be discharged, wherein when each of a print permitting pixel group consisting of a plurality of adjacent print permitting pixels and a print permitting pixel that is not adjacent to the other print permitting pixels in each of the mask patterns is defined as a single unit, a mean of the numbers of the print permitting pixels in the units in one mask pattern of the plurality of second mask patterns is larger than a mean of the numbers of the print permitting pixels in the units in one mask pattern of the plurality of first mask patterns, and the generating unit is configured to generate the plurality of print data based on the plurality of first mask patterns when the determining unit determines that the attribute of the image to be printed in the determination area is a first attribute and configured to generate the plurality of print data based on the plurality of second mask patterns when the determining unit determines that the attribute of the image to be printed in the determination area is a second attribute different from the first attribute.

* * * * *